June 9, 1942.   J. P. STANDO ET AL   2,285,470
PLURAL LENS MOUNT
Filed Nov. 21, 1938   7 Sheets-Sheet 1

Inventors:
Joseph P. Stando
Kenneth W. Kennedy
Rudolph J. Anschicks
By: Still and Still Attys.

June 9, 1942.　　J. P. STANDO ET AL　　2,285,470
PLURAL LENS MOUNT
Filed Nov. 21, 1938　　7 Sheets-Sheet 5

June 9, 1942.　　　J. P. STANDO ET AL　　　2,285,470

PLURAL LENS MOUNT

Filed Nov. 21, 1938　　　7 Sheets-Sheet 6

Witness:
V. Siljander

Inventors:
Joseph P. Stando
Kenneth W. Kennedy
Rudolph J. Anschicks
By: Hill and Hill
Attys.

June 9, 1942.　　J. P. STANDO ET AL　　2,285,470
PLURAL LENS MOUNT
Filed Nov. 21, 1938　　7 Sheets-Sheet 7

Witness:
V. Siljander

Inventors:
Joseph P. Stando
Kenneth W. Kennedy
Rudolph J. Anschicks
By Hill and Hill Attys Patented June 9, 1942

2,285,470

UNITED STATES PATENT OFFICE 2,285,470

PLURAL LENS MOUNT

Joseph P. Stando, Kenneth W. Kennedy, and Rudolph J. Anschicks, Chicago, Ill., assignors, by mesne assignments, to Prismacolor, Inc., Chicago, Ill., a corporation of Illinois Application November 21, 1938, Serial No. 241,500

10 Claims. (Cl. 88—16.4)

The invention relates to apparatus for projecting, in exact superimposed relation upon a screen, of a plurality of images or color cut-outs of the same photographed object impressed upon a plate or film.

More particularly, the invention relates to improvements in the means for actuating a plurality of lenses comprising a lens system or unit.

As is well known to those familiar with the art, the individual images or color cut-outs of the same photographed object provided by a film or a plate are projected upon a screen by an assembly of juxtaposed lenses, the individual lenses being positioned in the path of light passed through the respective color cut-outs and focused upon a screen in superimposed relation. For example, the assembly comprises three laterally juxtaposed lenses in three color projection, the lenses being in vertical juxtaposition when used with films movable vertically through the projector and in horizontal juxtaposition if the films are moved horizontally. The focal planes of the images are brought into coincidence with the projection screen by advancing or retracting the lenses together as a unit, and exact superimposition of the various images is accomplished by moving the outer lenses relative to the middle lens.

The invention has as one of its objects the provision of a single means operable both to shift the common focal plane of the lenses and to maintain the images formed by the lenses in exact superimposition for all positions of their common focal plane. More particularly, the invention provides improved means for actuating a plurality of lenses having a common focal plane and a common intersection point of their optical axes, said means being operable to advance or retract the lenses together to correspondingly vary the distance of their common focal plane to bring it into coincidence with the projection screen, said means being also operable automatically to move the lenses together or apart whereby the common point of intersection of their optical axes is maintained in their common focal plane and the images respectively produced by said lenses are in exact superimposition in said plane for all positions of the lenses.

Another object of the invention is the provision of improved means for adjusting the relative positions of the lenses to maintain their optical axes in a common plane.

Still another object of the invention is the provision of improved means for rotating the lens assembly about a common axis whereby the plane containing the optical axes of all the lenses is shifted into coincidence with the plane determined by a longitudinal line through the three color cut-outs simultaneously exposed upon a screen. Theoretically, this adjustment is unnecessary, but owing to distortions in films, the color cut-outs impressed thereon are sometimes not in exact longitudinal alignment and this is corrected by the described rotation of the lenses about a common axis.

A still further object of the invention is the provision of improved means for moving a lens housing away from and toward a projector case on which the housing is mounted to facilitate the insertion and removal of films.

Still another object of the invention is the provision of improvements in lens mounts or housings of the kind described which are durable, simple, inexpensive to manufacture and satisfactory for their intended purpose.

Many other objects and advantages of the construction herein shown and described will be obvious to those skilled in the art from the disclosure herein given.

To this end the invention consists in the novel combination, arrangement and construction of parts herein shown and more particularly pointed out in the claims.

In the drawings wherein like reference characters indicate like or corresponding parts.

Referring now more particularly to the drawings, the projector comprises a suitable portable case 20 providing a housing for an electric lamp 21, a fan 22, a motor 23 for actuating the fan, a reflector 24, and condensers 25. A pair of contact members 26 in the rear of the case 20 are connected with the lamp 21 and the motor 23 by a circuit not shown. The lamp 21 and motor 23 are energized by connecting the contact members 26 with any suitable source of electrical energy. Further description of the foregoing enumerated elements is omitted since these elements may be of any construction and arrangement suitable to cause light to pass through a film 27 and through a lens housing, generally designated by the numeral 28 and mounted on the front of the case 20 as hereinafter more particularly described.

The film 27 is shown as providing a plurality of sets of three color cut-outs or images and is positioned between the case 20 and the lens housing 28, the housing being movable away from the case to facilitate installation of the film in its initial exposed position. For this purpose, the case 20 provides two forwardly projecting rods 29 forming supports for and permitting advance and retraction of the lens housing 28. The rear portion of the housing 28 comprises an inner continuous frame member 30 having its upper and lower ends bounded by inner arcuate surfaces. A vertically extending member 31, fastened on one side of the member 30 by screws 32, provides hollow cylinders 33 through which the rods 29 extend and thereby support the housing 28 on the case 20. The housing 28 is normally maintained in retracted position in contiguity to the case 20 by means of compression springs 34 mounted on the front projecting ends of the rods 29. Screw bolts 35 forming extensions of the rods 29 provide abutments for the forward ends of the springs 34. The rear ends of the springs 34 abut the cylinders 33 and are yieldable under pressure to permit forward movement of the housing 28 on the rods 29, the resistance of the springs being adjusted as desired by threading the bolts 35 to vary the spacing of their heads from the cylinders 33.

Figures 4, 8, 9:
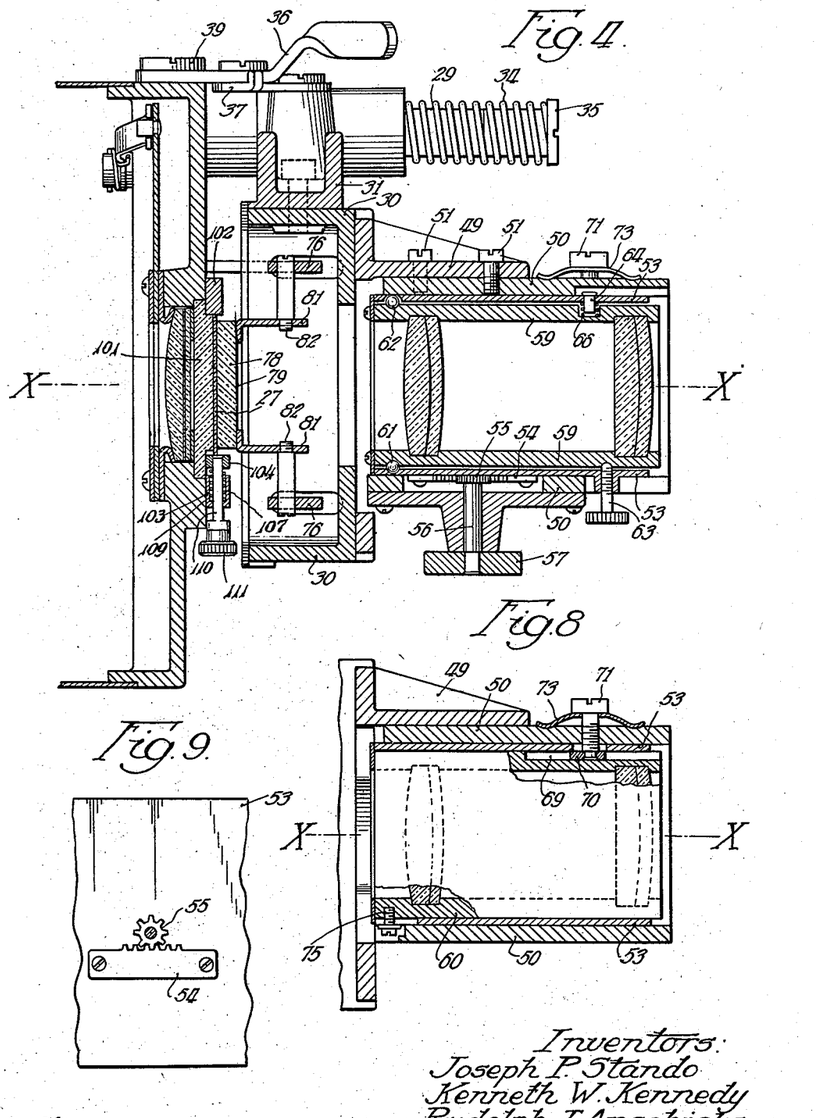
Fig. 4 is a horizontal sectional view along the line 4—4 of Fig. 3.
Fig. 8 is a horizontal sectional view along the line 8—8 of Fig. 3.
Fig. 9 is an elevational view of a rack and pinion shown in plan in Fig. 4 and operable to actuate the projection lenses.
Figures 5, 6, 7:
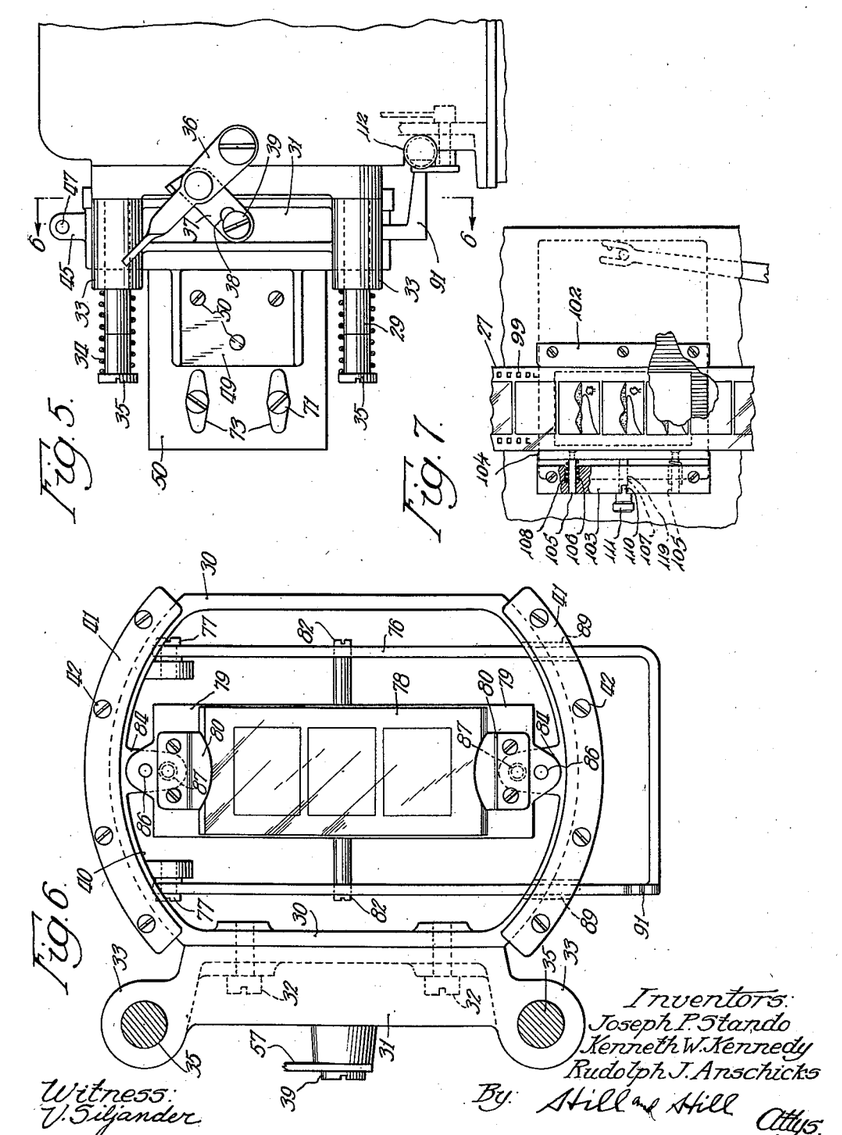
Fig. 5 is an elevational view of the opposite side of the lens housing from that shown in Fig. 1.
Fig. 6 is a rear elevational view of the lens housing taken approximately along the line 6—6 of Fig. 5.
Fig. 7 is an elevational view of a portion of the case taken approximately along the line 7—7 of Fig. 3.

The lens housing 28 is moved away from the case 20 by actuating a lever 36 and a link 37 providing a toggle connection between the case and the housing, as shown in Figs. 4 and 5. The lever 36 is mounted on the case 20 and the link 37 has one end pivotally connected with the lever and its other end providing an elongated aperture 38 containing a pin 39. The pin 39 is mounted on the member 31 intermediate the cylinders 33. Initial downward movement of the lever 36 operatively engages the link 37 with the pin 39 and further downward movement of the lever moves the housing 28 away from the case 20 against the resistance of the springs 34 to a position wherein the lever and link cooperate to hold the housing in its advanced position while inserting the film 27 as hereinafter described. Upward movement of the lever 36 breaks the toggle connection and permits the springs 34 to retract the housing 28 to its normal projecting position after insertion of the film.

Figures 3, 10, 11:
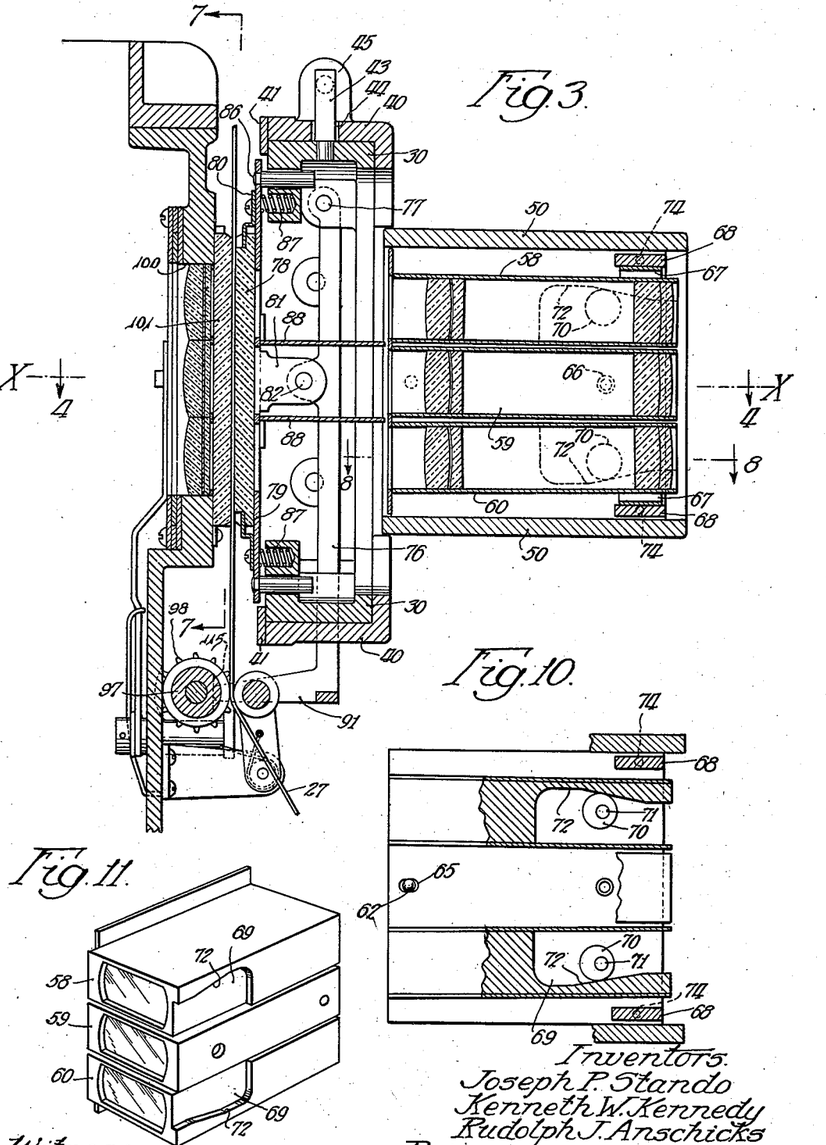
Fig. 3 is a vertical sectional view along the line 3—3 of Fig. 2.
Fig. 10 is a view taken approximately along the line 10—10 of Fig. 2.
Fig. 11 is a perspective view of a lens carrying box embodying the principles of the invention.

The housing 28 also comprises an outer hollow member 40 having arcuate upper and lower flanged ends engaging the corresponding arcuate ends of the member 30 and having a sliding fit with the latter. Metal bands 41, fastened to the rear faces of the flanges of the member 40 by screws 42, project inwardly as shown in Fig. 3 to hold the members 30 and 40 against relative longitudinal movement.

Means are provided for rotating the member 40 relative to the member 30 about a longitudinal axial line X—X coinciding with the center of the lens housing for a purpose hereinafter described. The means for rotating the member 40 includes a pin 43 fixedly mounted on the member 30 and projecting upwardly through a slot 44 in the top flange of the member 40. Lugs 45, projecting from the member 40 on opposite sides of the slot 44, respectively provide mountings for an actuating screw 46 engaging the pin 43 and for a screw 47 carrying a compression spring 48, the spring having its ends respectively abutting the pin and the adjacent lug 45. Threading of the screw 46 to the right, as observed in Fig. 2, rotates the member 40 in counter-clockwise direction and opposite threading of the screw permits the spring 48 to rotate the member 40 in clockwise direction.

Figure 1:
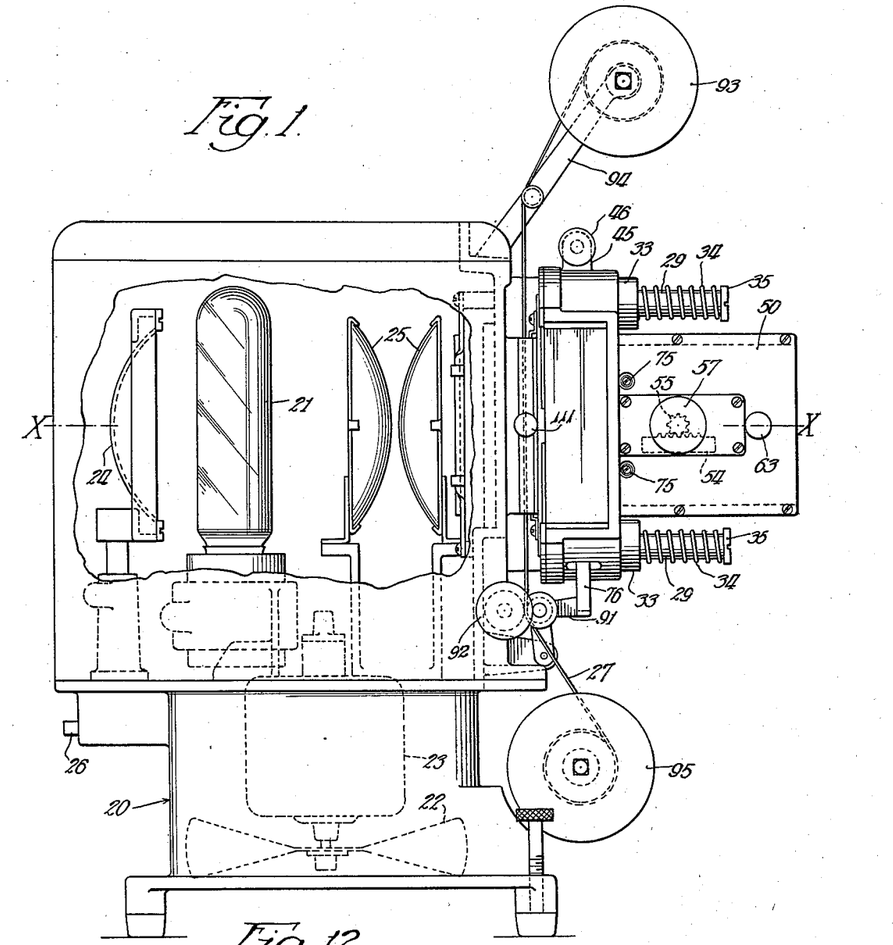
Fig. 1 is a side elevation of a projector comprising a cooperating case and lens housing or mount, embodying the principles of the invention, in side elevation and with a portion of the wall of the case broken away.
Figure 2:
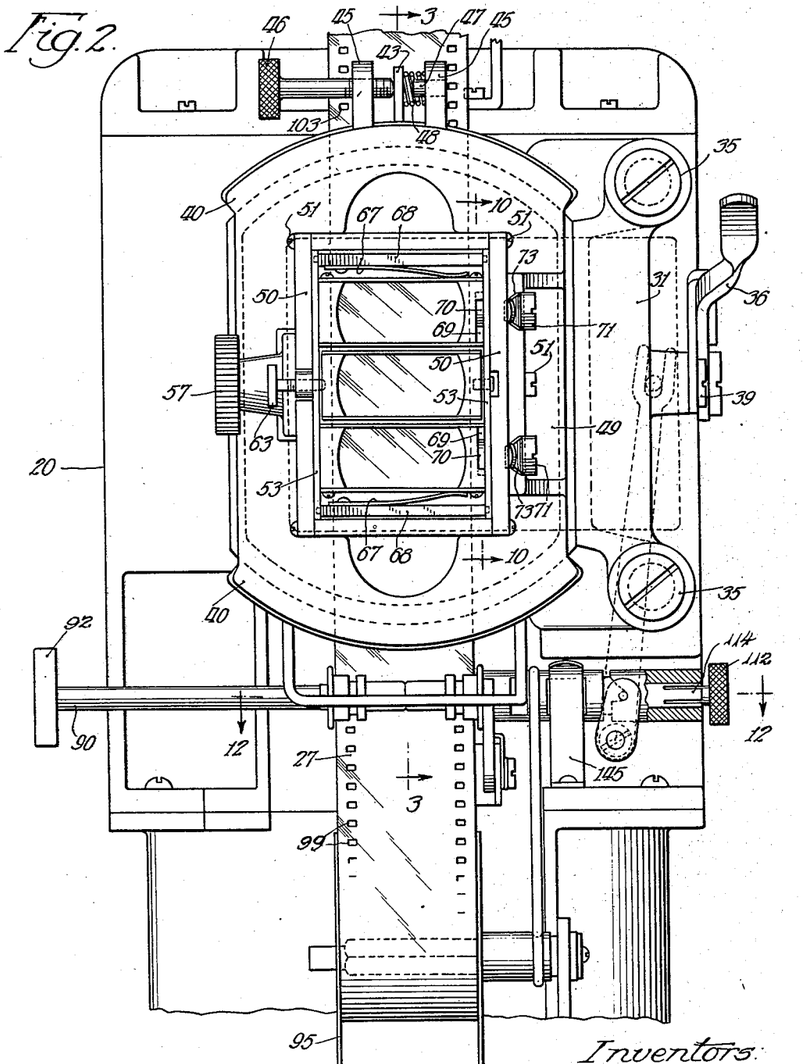
Fig. 2 is a front elevational view of the lens housing and projector case.

One side of the member 40 provides a forwardly projecting bracket member 49 with which an outer lens box 50 is rigidly connected by screws 51. The box 50 is rectangular in cross section and is shown in Fig. 2 as comprising four plates suitably connected by screw bolts 52. An inner lens box 53 is longitudinally movable in the box 50 by a rack 54 and a pinion 55, as best shown in Figs. 4 and 9. The pinion 55 is mounted on one end of a shaft 56 extending through one side of the outer box 50 and operable by a knob 57 to rotate the pinion and move the inner box 53 longitudinally in the box 50.

Upper, intermediate, and lower vertically juxtaposed lens carrying members, respectively designated by the numerals 58, 59, and 60, are mounted in the box 53, and are reciprocally movable longitudinally with the box as it is advanced and retracted by rotating the knob 57. The lenses carried by the members 58, 59, and 60 are so constructed that each has a common focal plane with the others, and the members 58 and 60 are pivotally connected with the box 53 adjacent their rear ends by means of stud bolts 75. The members 58 and 60 converge outwardly in such a manner that the optical axes of the lenses respectively carried thereby intersect the optical axis of the lens carried by the middle member 59 at a common point. The lenses carried by the members 58, 59, and 60 are so arranged that their optical axes are positioned in a common vertical plane with the optical axis of the lens carried by the member 59 in exact coincidence with the longitudinal axial line X—X about which the member 40 and the lens boxes 50 and 53 carried thereby are rotatable. The inner lens carrying member 59 is fixedly mounted in the box 53 and the members 58 and 60 are tiltable about the bolts 75 which provide axes of rotation perpendicular to the vertical plane in which the optical axes of the lenses are positioned.

The middle member 59 is held against vertical or longitudinal movement relative to the inner box 53 by means of ball bearings 61 and 62 mounted in the rear end of the box 53, and also by a set screw 63 extending through the front end of the box on one side and by a pin 64 extending through the box on the opposite side with its inner end in bearing contact with the member, all as shown in Fig. 4. The member 59 is spaced from the side walls of the box 53, and the ball bearings 61 and 62 are seated in and closely fit corresponding recesses in the side walls of the member. The adjacent side wall of the box 53 provides a recess closely fitting and forming a seat for the ball bearing 61. The opposite side wall of the box 53 provides a horizontally elongated aperture 65 in which the ball bearing 62 is seated and through which it projects to contact with the adjacent side wall of the fixed box 50. The ball bearings 61 and 62, the screw 63 and the pin 64 cooperate to hold the member 59 against either vertical or longitudinal movement relative to the box 53 and are adapted to permit transverse rotation of the member about the roller 61 to vertically align the optical axis of the lens carried by the member with the optical axes of the upper and lower lenses when necessary. The described transverse movement of the member 59 is accomplished by shifting the position of the screw 63, inward movement of the screw 63 being resisted by a compression spring 66 carried by the pin 64. Outward threading of the screw 63 permits the spring 66 to rotate the member 59 to follow and to maintain the member in constant contact with the screw, it being understood that this is primarily a shop adjustment device, and having been once adjusted for alignment of the optical axes of the three lenses in a common plane, its further adjustment is seldom found necessary.

An important feature of the invention is the provision of mechanism whereby advance and retraction of the box 53 by manual rotation of the shaft 55 by the knob 57 also moves the outer lenses laterally to maintain the images respectively projected by the lenses in the common image plane for all positions of the lenses. The lens carrying members 58 and 60 are automatically equally tiltable outwardly to diminish the convergence of the outer lenses as the box 53 is retracted to increase the common focal distance of all three lenses, and are similarly tilted inwardly as the box is advanced to diminish the common focal distance of the lenses, the tilting being such that the images respectively projected by the lenses are always in the common focal or image plane of the three lenses. The automatic tilting of the members 58 and 60 is accomplished by cam mechanism cooperating with a pair of resilient members such as leaf springs 67 suitably mounted on bars 68 positioned at the front end of the box 53. The leaf springs 67 are respectively positioned between and connect the members 58 and 60 with the bars 68 and constantly tend to pull the front ends of the members toward the middle member 59. The springs 67 each have one end fixedly connected to the contiguous bar 68 by any suitable means such as welding and the opposite ends of the springs are similarly connected to the contiguous outer lens carrying members. The ends of the bars 68 are connected with the housing 53 by pivots 74 permitting rotation of the bars to respectively maintain them in exact parallelism with the adjacent members 58 and 60 and thereby avoid twisting of the springs 67 which would result from rotation of the members 58 and 60 if the bars were not rotatable. Corresponding side walls of the members 58 and 60 are each provided with a recess 69 in which is positioned a cam disc 70 eccentrically and fixedly mounted on a screw bolt 71. The bolts 71 extend through longitudinally elongated apertures 83 provided by the inner box 53 and are journalled in the outer box 50. The discs 70 operatively engage cam surfaces 72 provided by the lateral bounding edges of the recess 69. The bolts 71 and the discs 70 respectively carried thereby are maintained in proper position and are held against rotation by spring plates 73 positioned between the heads of the bolts and the side wall of the box 50. The two cam surfaces 72 are symmetrical about a horizontal plane through the optical axis of the middle lens, and as the box 53 is retracted to increase the focal distance of the lenses, the front ends of the members 58 and 60 are moved away from the middle member 59 by reason of the sliding contact of the cam surfaces with the discs 70 and thereby diminish the convergence of the optical axes of the outer lenses and correspondingly advance the common point of intersection in such a manner or at such a rate that the images respectively projected by the lenses are always in exact superimposition in the common image plane. As the box 53 is advanced to shorten the common focal distance of the lenses the springs 67 pull the forward ends of the members 58 and 60 together to maintain the cam surfaces 72 in contact with the discs 70 and thereby retract the common point of intersection of the optical axes. The cam surfaces 72 have a configuration such that the common intersection point of the optical axes is automatically shifted to constantly maintain exact superimposition of the images in the common focal plane of the three lenses. The cam discs 70 are set in the shop to main equality of convergence of the members 58 and 60 and are adjustable by rotation of the bolts 71 to compensate for wear, but such adjustment is in general found necessary only at long intervals. The spring plates 73 are relatively rigid and effectively clamp the discs 70 against the box 50 in adjusted position and prevent accidental rotation of the discs.

The lens housing 28 carries an inverted U-shaped member 76, suspended from and oscillatable about pins 77 connected with the upper end of the member 49 to provide a tiltable mounting for a transparent film pressure plate 78 as best shown in Fig. 6. The ends of the plate 78 are rigidly fastened to a frame 79 by clips 80. The middle of the frame 79 has forwardly extending lugs 81 pivotally connected with the member 76 by screws 82 threaded into the lugs and journalled in the member. Inwardly extending lugs 84 on the upper and lower ends, respectively, of the member 49 provide apertures 85 in which are positioned pins 86 projecting forwardly from the frame 79. Compression springs 87 normally maintain the ends of the frame 79 in slightly spaced relation to the lugs 84 and the apertures 85 provide guides for the pins 86 as the frame is oscillated about the screws 82 to vary the inclination of the pressure plate 78 to operatively engage the film 27 when the lens housing 28 is retracted after insertion of the film. The frame 79 provides two forwardly projecting horizontal plate members 88 in longitudinal alignment, respectively, with the top and the bottom walls of the middle lens carrying member 59. The lower end of the U-shaped member 76 projects through aligned recesses 89 provided by the lens housing members 39 and 40, the recesses being elongated longitudinally to permit oscillation of the member 76 and being of sufficient width that the latter does not contact with either the member 30 or the member 40 when the member 40 is rotated relative to the member 30, as previously described.

The U-shaped member 76 is adapted to be intermittently moved forwardly against the resistance of the springs 87 to advance the pressure plate 78 to clear the film 27 while the lens housing 28 is in its normal retracted position. The advance of the pressure plate 78 is accomplished by the rotation of a shaft 90 mounted on the front end of the case 20 below the lens housing 28 and occurs while the film is being moved by the shaft from one exposed position to another. A cam member 91 rigidly connected with the U-shaped member 76 has its rear end operatively engaging the shaft 90, whereby the member is advanced and retracted once for each complete revolution of the shaft.

The shaft 90 is manually actuated by a knob 92 and as a result of one complete revolution of the shaft, the U-shaped member 76 is advanced to release the pressure plate 78 from engagement with the film 27, and the film is advanced to bring another set of color cut-outs into registration with the lens carrying members 58, 59, and 60, respectively, following which the U-shaped member is retracted to operatively engage the pressure plate with the film.

The film 27 is carried by a spool 93 rotatably mounted on a supporting arm 94 connected with the top of the case 20, and as the film is advanced through the projector, it is wound on a lower spool 95. A sleeve 97 carried by and rotatable with the shaft 90 provides a plurality of circumferentially aligned sprockets 98 adjacent each end and so positioned as to enter corresponding marginal apertures 99 in the film 27 and thereby permits the film to be advanced in exact accordance with the rotation of the shaft.

Figure 12:
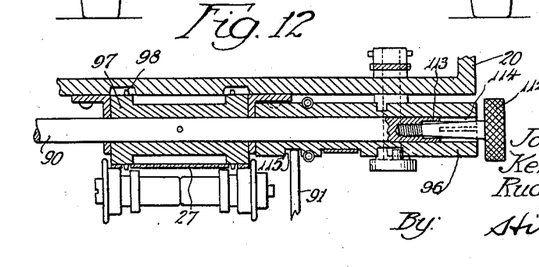
Fig. 12 is a view along the line 12—12 of Fig. 2.

The front wall of the case 20 provides an aperture 100 covered by a transparent glass plate 101 fixedly mounted on and fastened to the case by guide members 102 and 103 overlapping its lateral edges as shown in Fig. 4. The film 27 extends between the plate 101 and the pressure plate 78 carried by the lens housing, the plate normally pressing the film against the plate 110 to prevent bulging or curling thereof while exposed to light from the lamp 21. The aperture 100 is in alignment with the rear ends of the lens carrying members 58, 59, and 60 and is maintained with the longitudinal center line of its exposed portion in coincidence with the vertical plane, through the optical axes of the lenses carried by the members 58, 59, and 60, this being accomplished by a spring controlled, laterally movable guide member 104 operatively engaging one edge of the film and tending to move the film transversely to contact its opposite lateral edge with the fixed guide member 102, as shown in Figs. 4 and 7. A plurality of pins 105, fixedly mounted on the guide member 117, extend through and are slidably movable in apertures 106 provided by the guide member 103. The inner ends of the apertures 106 are enlarged to receive compression springs 108, each having one end abutting the guide member 104 and the other end abutting the fixed member 103. The springs 120 tend to move the member 117 to engage the adjacent edge of the film and thrust it laterally into contact with the guide member 102. The member 104 is also manually controlled by means of a pin 110 extending through an aperture 107 in the member 103 and terminating in a knob 111, movement of the latter being resisted by a spring 109. A sleeve 96 is normally caused to rotate with the shaft 90 by threading a stud screw 112 into a bore 113 provided in the contiguous end of the shaft. The intermediate portion of the bore 113 is offset as shown and the end of the shaft is longitudinally recessed at the outer end of the bore to provide a plurality of relative thin slightly flexible sections 114. The intermediate portion of the screw 112 is tapered and adapted to engage and force the shaft sections 114 outwardly into frictional engagement with the sleeve 96 when the screw is in the position shown in Fig. 12. The sections 114 are released from frictional engagement with the sleeve 96 to permit rotation of the shaft 90 independently of the sleeve by oppositely threading the screw 112 to disengage the sections 140.

The resilience of the springs 87 normally maintains the U-shaped member 76 with the cam member 91 in operative engagement with the sleeve 96 carried by the shaft 90. The sleeve 96 has a tangential recess 115 positioned to receive the rear end of the cam member 91 and thereby permit retraction of the U-shaped member 76 to operatively engage the pressure plate 78 with the film immediately before the shutter is opened and thereby to prevent bulging or curling of the film. Initial rotation of the shaft 90 and sleeve 96 causes the cam member 91 to move out of the recess 115 and thereby thrust the U-shaped member 76 forwardly to release the film from engagement with the plate 78. The release of the film 27 from pressure by the plate 78 permits it to be advanced and avoids scratching of the film which might otherwise occur if the film is advanced while under pressure.

The housing 28 is advanced or moved away from the casing 20 against the pressure of the springs 34 by actuation of the lever 36 and is held in advanced position by the toggle action of the lever and the link 37 to permit insertion of the film 27 between the lens housing and the case 20. The spool 93 carrying the film 27 being rotatably mounted on the arm 94, a portion of the film is unwound and initially engaged with the winding spool 95. The film is then advanced by rotation of the shaft 90, without movement of the sleeve 96, to a position wherein a trial exposure indicates that the sets of three color cut-outs will be successively brought into exact registry and juxtaposition with the projector lenses by one complete rotation of the shaft. The sleeve 96 is then operatively connected with the shaft 90 by threading the screw 112 to press the shaft sections 114 into engagement with the sleeve. The shaft 90 and sleeve 96 are then rotated together to bring the first set of three color cut-outs respectively into registry with the three projecting lenses, the film being aligned transversely for coincidence of its longitudinal center line with the axial line X—X by means of the guide member 104.

The lens box 53 is then advanced or retracted by turning the shaft 57 to actuate the pinion 55 and rack 54 to obtain the required focus and precision of registration and superimposition of the projected images from the color cut-outs on the projection screen by a single operation, as described, it being understood that having once obtained the proper focus and registration of the images, no further focusing or adjustment for registration is required during successive exposures of the color cut-outs for the same screen distance.

If the projection of the images discloses that the plane containing the optical axes of the three lenses is not exactly parallel with the longitudinal axis of the film, such parallelism may be obtained by actuating the screw 46 to rotate the lens housing member relative to the member 30 about the line X—X as an axis. If the projection of the images should disclose that the optical axis of the middle lens is not exactly in the plane containing the optical axes of the outer lenses, this can be corrected by manipulation of the screw 63 to rotate the middle lens carrying member 59 about the ball bearing 61 as described.

An alternative form of triple lens assembly embodying the principles of the invention is illustrated in Figs. 13 to 19 and generally designated by the numeral 149. The assembly 149 comprises upper, intermediate and lower lens carrying members respectively designated by the numerals 150, 151, and 152. The members 150, 151, and 152 are carried by a side plate 153 and the assembly 149 is adapted to be mounted on the bracket 49 provided by the housing member 40 by means of screws 51 shown in Fig. 4 for the lens assembly above described. The assembly 149 is illustrated as detached from the lens housing 28, and when attached as described, it is rotatable with the member 40 about the line X—X as an axis to bring the plane containing the optical axes of the lenses into exact coincidence with the longitudinal axis of the film for the same purpose and in the same manner as described for the construction shown in Figs. 1 to 12.

Figure 13:
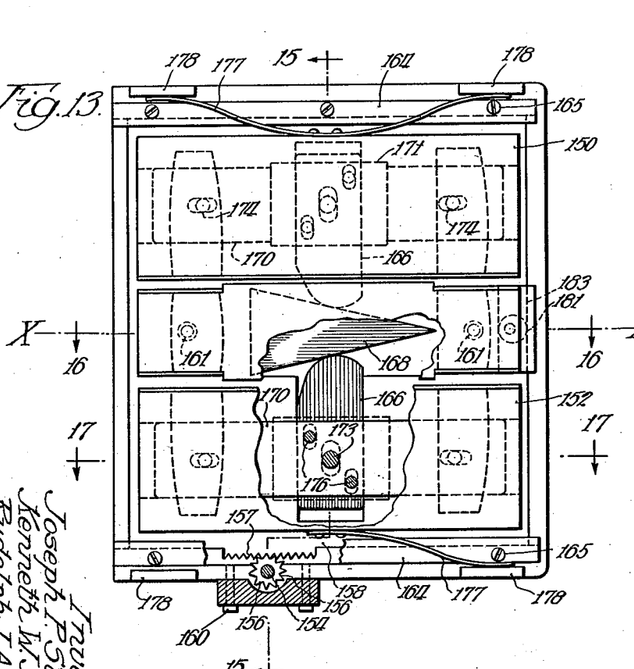
Fig. 13 is a side elevational view of an alternative form of triple lens assembly embodying the principles of the invention.
Figure 14:
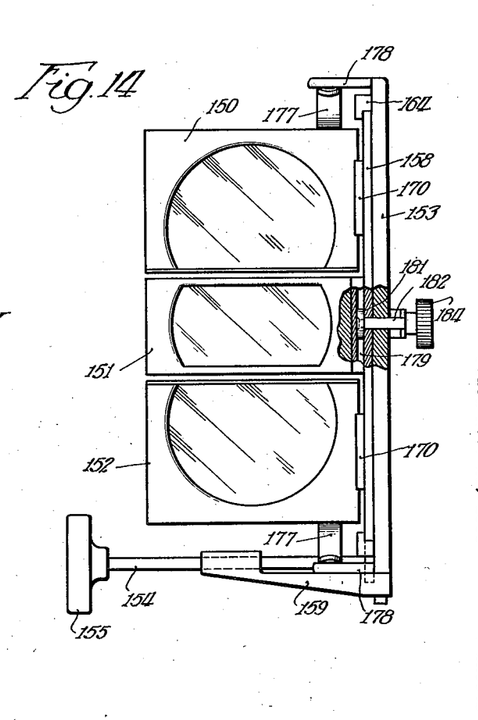
Fig. 14 is a front end view of the assembly shown in Fig. 13.
Figure 15:
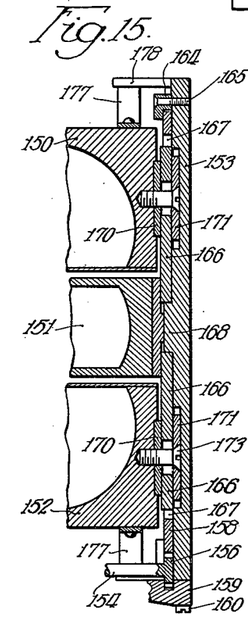
Fig. 15 is a fragmentary sectional view taken along the line 15—15 of Fig. 13.

The lens carrying members 150, 151, and 152 are reciprocally movable longitudinally as a unit by manually rotating a shaft 154 having an actuating knob 155 on one end and a pinion 156 on the other. The shaft 154 is supported by a bracket 159 fastened to the lower edge of the plate 153 by means of bolts 160. The pinion 156 operatively engages a rack 157 formed on the lower edge of a plate 158 positioned between the side plate 153 and the lens carrying members, the plate being movable relative to the side plate by the rack and pinion.

The plate 158 is held in sliding contact with the side plate 153 by upper and lower guide members 164 fastened to the side plate by bolts 165. The intermediate lens carrying member 151 is fastened to the plate 158 by screw bolts 161 threadedly engaging rings 162 positioned in recesses 163 provided by the member. The heads of the bolts 161 are counter-sunk and closely fit the plate 158 and the shanks of the bolts closely fit the side wall of the member 151 whereby the member is caused to move longitudinally with the plate and vertical movement of the member is prevented.

The outer lens carrying members 150 and 152 are also each movable longitudinally with the plate 158 by means of a vertically extending bar 166 operatively connected with the adjacent side wall of each member. The bars 166 are positioned in vertically extending apertures 167 provided by the plates 158, the edges of the bars having a sliding fit with the side walls of the aperture and the inner ends of the bars providing cam faces adapted to engage the adjacent edges of a wedge shaped cam member 168 projecting from the side plate 153 and positioned in a longitudinally extending aperture 169 provided by the plate 158. The bars 166 are each positioned between plates 170, extending longitudinally and contiguous to the members 150 and 152, and an outer plate 171. The plates 170 are recessed slightly to receive the bars 166 and the side plate 153 provides an elongated aperture 172 in which the plate 171 is positioned. A screw 173 connects each bar 166 and the adjacent plates 170 and 171 to the members 150 and 152, respectively. The ends of the plates 170 are connected with the members 150 and 152 by screw bolts 174 extending through the plate 158 and having their heads positioned in apertures 175 provided by the side plate 173. The bars 166 are held against possibility of rotation about the screws 173 by a pair of screws 176 projecting from and connecting the bars with the plate 171.

The members 150 and 152 are pressed toward the middle member 151 by leaf springs 177 mounted on the members with their ends engaging projecting members 178 provided by the side plate 153. The members 150 and 152 converge inwardly so that the optical axes of the lenses respectively carried thereby intersect the optical axis of the lens carried by the member 151 at a common point it being understood that the images respectively projected by the lenses are in exact superimposition for all positions thereof and the inclination and curvature of the convergent faces of the wedge member 168 are such that the members 150 and 152 are moved laterally at a rate such that exact and constant superimposition of the images is maintained for all positions of such images. The springs 177 maintain the ends of the bars 166 in engagement with the cam member 168 and as the lens carrying members are advanced or retracted by the plate 158, the outer members are equally moved toward and away from the middle member without varying the inclination of their optical axes.

The members 150 and 152 are so arranged that the lenses respectively carried thereby have a common image plane and the common intersection point of their optical axes coincides with the common image plane as the latter is moved toward and away from the projector by longitudinal movement of the lenses together. The various screws, bolts, and pins, described as connecting the bars 166 and the plates 158 and 170 with the lens carrying members, extend through slotted holes to permit shop adjustment of the position and inclination of the lenses in order that the image planes of the various lenses will exactly coincide and that the common intersection point of the optical axes of the lenses will be maintained in the shiftable common image plane to obtain exact superimposition of the images in said plane.

Figure 16:
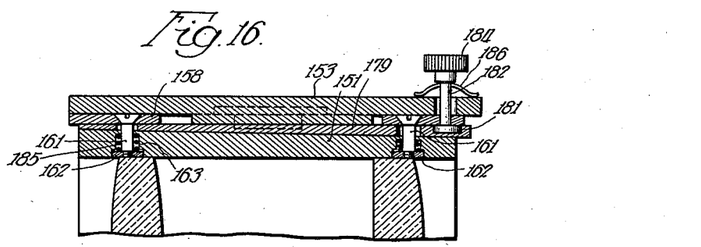
Figs. 16 and 17 are respectively fragmentary sectional views taken along the lines 16—16 and 17—17 of Fig. 13.
Figure 17:
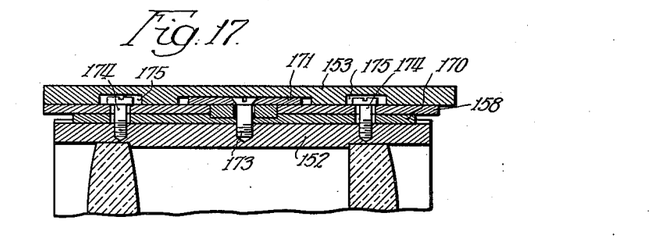
Figures 18, 19:
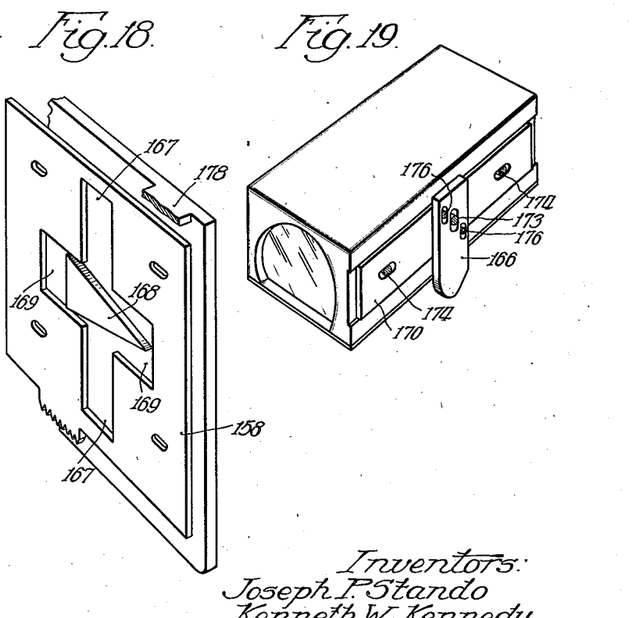
Fig. 18 is a perspective view of a cam plate forming a portion of the alternative lens assembly.
Fig. 19 is a perspective view of one of the lens carrying members shown in Figs. 13 and 14.

The middle lens carrying member 151 is adjustably movable transversely in order that the optical axis of the lens carried thereby may be brought into and maintained in a common plane with the optical axes of the lenses carried by the outer members 150 and 152. The described transverse movement of the member 151 is accomplished by longitudinally moving a wedge plate 179 positioned between the plate 158 and the side wall of the member 151 as best shown in Fig. 16. The opposite side faces of the plate 179 converge and the contiguous side face of the member 151 is correspondingly inclined so that the outer face of the plate 179 is parallel to the optical axis of the lens carried by the member 151. The plate 179 is movable between the plate 158 and the member 151 by means of a cam disk 181 eccentrically mounted on one end of a shaft 182. The disk 181 is positioned in and slidingly fits opposite side walls of an elongated recess 183 provided by the plate 179. The shaft 182 projects through the side plate 153 with its projecting end providing a knob 184 by means of which the shaft is rotated to actuate the disk 181 to advance or retract the plate 179. Movement of the plate 179 to the left as observed in Fig. 16 will cause the member 151 to be moved away from the plate 158 against the resistance of compression springs 185 respectively positioned in a constricted portion of the recesses 163 through which the screws 161 extend. The springs 185 each have an end abutting the side wall of the member 151 and the other end abutting the rings 162 threadedly engaging the screws 161. Movement of the plate 179 to the right as observed in Fig. 16 will permit the springs 185 to correspondingly move the member 151 toward the plate 158. Proper adjustment of the member 151 by moving the plate 179 is preferably made in the shop and the shaft 182 is held in adjusted position against accidental rotation by means of a spring plate 186. If subsequent adjustment of the transverse position of the member 151 is found necessary, this is easily accomplished by rotation of the shaft 182 to move the plate 179 as described. The optical axis of the lens carried by the member 151 coincides with the line X—X when the member is in proper adjusted position and the described lateral movement of the outer lens carrying members 150 and 152 without shifting the angles of inclination of their optical axes permits exact superimposition of the images on screens positioned as close as practicable to the projector and for any other screen distance without perceptible "keystoning" of the images.

Thus, it will be seen that the invention provides improvements in multiple lens housings of the kind described operable by a single means to simultaneously move the lenses longitudinally as a unit and to correspondingly move the lenses laterally in a manner such that the optical axes of the various lenses always intersect at a common point and the common point is such that there is constant and exact registry or superimposition of the images in the common image plane of the lenses for all positions thereof, and whereby the projected images are always in exact superimposition upon the screen.

The invention also provides novel means for relatively shifting the lenses transversely to maintain their optical axes in a common plane and means for rotating the lenses together about an axis to bring the plane of said axes into coincidence with a longitudinal line extending through the color cut-outs of a film being projected through the lenses.

Having thus described our invention, it is obvious that various immaterial modifications may be made in the same without departing from the spirit of our invention; hence we do not wish to be understood as limiting ourselves to the exact form, construction, arrangement and combination of parts herein shown and described or uses mentioned.

What we claim as new and desire to secure by Letters Patent is:

1. In apparatus of the kind described, the combination with film or plate supporting means of a lens mount comprising a supporting member, a casing open at the ends and longitudinally movable relative to said member in a direction normal to said film or plate, a plurality of lenses mounted in and longitudinally movable with said casing, said lenses having their optical axes substantially parallel to said direction of movement and being so mounted in the casing that they have a common image plane, means for reciprocally moving said casing and lenses longitudinally to correspondingly move the common image plane towards and away from said lens mount, cam mechanism operable by said movement of the casing and lenses to move said lenses transversely relative to each other in a manner to maintain the images respectively projected by said lenses in exact registry in said common image plane, and means for moving said lens mount away from said film supporting means to facilitate the insertion or removal of a film.

2. In apparatus of the kind described, the combination with means for supporting a film or plate of a lens mount angularly adjustable about an axis normal to said film or plate, said lens mount comprising a support, a casing longitudinally movable in the direction of said axis, a plurality of lenses mounted in and longitudinally movable with said casing, said lens being so mounted in the casing that they have a common image plane and having their optical axes intersecting at a common point, means for reciprocally moving said casing and lenses longitudinally to correspondingly move the common image plane towards and away from said lens mount, cam mechanism operable by said reciprocal movement of the casing and lenses to move said lenses laterally relative to each other in a manner to maintain exact registry in said common image plane of all the images, means for rotating said lens mount to bring said lenses into a position wherein their respective optical axes lie in a plane substantially coincident with the longitudinal center line of the film, and means for moving said lens mount away from said film supporting means to facilitate insertion or removal of a film.

3. In apparatus of the kind described, the combination with film or plate supporting means of a lens mount angularly adjustable about an axis normal to the film or plate, said lens mount comprising a supporting member, a casing open at the ends and longitudinally movable relative to said member in the direction of said axis, a plurality of lenses mounted in and longitudinally movable with said casing, said lenses being laterally juxtaposed longitudinally of the film and so mounted in the casing that they have a common image plane and their optical axes intersect at a point, means for reciprocally moving said casing and lenses carried thereby to correspondingly move the common image plane towards and away from said lens mount, cam mechanism operable by said movement of the casing and lenses to correspondingly move said lenses laterally relative to each other in a manner to maintain exact registry in said common image plane of the images respectively projected by said lenses, means for oscillating said lens mount about said axes normal to the film, means for shifting said lenses transversely to bring their optical axes into a common plane, and means for shifting the film transversely to bring its longitudinal center line into said common plane of the optical axes of said lenses.

4. In apparatus of the kind described, the combination with film or plate supporting means of a lens mount angularly adjustable about an axis normal to the film or plate, said lens mount comprising a supporting member, a casing open at the ends and longitudinally movable relative to said member in the direction of said axis, a plurality of lenses mounted in and longitudinally movable with said casing, said lenses being laterally juxtaposed longitudinally of the film and so mounted in the casing that they have a common image plane and their optical axes intersect at a point, means for reciprocally moving said casing and lenses carried thereby to correspondingly move the common image plane towards and away from said lens mount, cam mechanism operable by said movement of the casing and lenses to correspondingly move said lenses transversely relative to each other in a manner to maintain exact registry in said common image plane of the images respectively projected by said lenses, means for oscillating said lens mount about said axis normal to the film, means for shifting said lenses transversely to bring their optical axes into a common plane, means for shifting the film transversely to bring its longitudinal center line into said common plane of the optical axes of said lenses, and means for moving said lens mount away from the film supporting means to facilitate insertion or removal of a film.

5. In apparatus of the kind described, the combination with film or plate supporting means of a lens mount angularly adjustable about an axis normal to the film or plate, said lens mount comprising a supporting member, a casing open at the ends and longitudinally movable in the direction of said axis, two spaced apart lenses pivotally mounted in and longitudinally movable with said casing and having their optical axes in the same plane as said axis of rotation, a lens fixedly mounted in said casing intermediate said spaced apart lenses with its optical axis coinciding with said axis of rotation, said lenses being so mounted in the casing that they have a common image plane and their optical axes intersect at a common point, means for reciprocally moving said casing and lenses carried thereby longitudinally to correspondingly move the common image plane towards and away from said lens mount, and cam mechanism operable by said reciprocal movement to move said outer lenses relative to the intermediate lens at a variable rate such as to maintain intersection of said optical axes at a point, and to maintain exact registry in said common image plane of the images respectively projected by said lenses for all positions thereof.

6. In apparatus of the kind described, the combination with film or plate supporting means of a lens mount angularly adjustable about an axis normal to the film or plate, said lens mount comprising a supporting member, a casing open at the ends and longitudinally movable in the direction of said axis, two spaced apart lenses pivotally mounted in and longitudinally movable with said casing and having their optical axes in the same plane as said axis of rotation, a lens fixedly mounted in said casing intermediate said spaced apart lenses with its optical axis coinciding with said axis of rotation, said lenses being so mounted in the casing that they have a common image plane and their optical axes intersect at a common point, means for reciprocally moving said casing and lenses carried thereby longitudinally to correspondingly move said common image plane towards and away from the lens mount, and cam mechanism operable by said reciprocal movement to correspondingly move said outer lenses relative to said intermediate lens to maintain intersection of said optical axes at a common point, and to maintain exact registry in said common image plane of the images respectively projected by said lenses for all positions of said lenses, and means for moving said lens mount away from said film supporting means to facilitate insertion or removal of film.

7. In apparatus of the kind described, the combination with film or plate supporting means of a lens mount angularly adjustable about an axis normal to the film or plate, said lens mount comprising a supporting member, a casing open at the ends and longitudinally movable in the direction of said axis, two spaced apart lenses pivotally mounted in and longitudinally movable with said casing and having their optical axes in the same plane as said axis of rotation, a lens fixedly mounted in said casing intermediate said spaced apart lenses with its optical axis coinciding with said axis of rotation, said lenses being so mounted in the casing that they have a common image plane and their optical axes intersect at a common point, means for reciprocally moving said casing and lenses carried thereby longitudinally to correspondingly move the common image plane towards and away from said lens mount, cam mechanism operable by said reciprocal movement to move said outer lenses relative to the intermediate lens at a variable rate such as to maintain intersection of said optical axes at a common point and to maintain exact registry in said common image plane of the images respectively projected by said lenses for all positions of said lenses, and means for rotating said lens mount about said normal axis to maintain the plane containing the optical axes of the lenses in coincidence with the longitudinal axis of the film.

8. In apparatus of the kind described, the combination with film or plate supporting means of a lens mount angularly adjustable about an axis normal to the film or plate, said lens mount comprising a supporting member, a casing open at the ends and longitudinally movable in the direction of said axis, two spaced apart lenses pivotally mounted in and longitudinally movable with said casing and having their optical axes in the same plane as said axis of rotation, a lens fixedly mounted in said casing intermediate said spaced apart lenses with its optical axis coinciding with said axis of rotation, said lenses being so mounted in the casing that they have a common image plane and their optical axes intersect at a common point, means for reciprocally moving said casing and lenses carried thereby longitudinally to correspondingly move the common image plane towards and away from said lens mount, cam mechanism operable by said reciprocal movement to correspondingly move said outer lenses relative to the intermediate lens to maintain intersection of said optical axes at a common point, and to maintain exact registry in said common image plane of the images respectively projected by the lenses for all positions of said lenses, means for rotating said lens mount about said normal axis to bring the optical axis of the lenses into coincidence with the longitudinal center line of the film, and means for moving said lens mount away from said film supporting means to facilitate insertion or removal of the film.

9. In apparatus of the kind described, the combination with film or plate supporting means of a lens mount angularly adjustable about an axis normal to the film or plate, said lens mount comprising a supporting member, a casing open at the ends and longitudinally movable in the direction of said axis, two spaced apart lenses carried by the casing and symmetrically positioned on opposite sides of said axis, said lenses being pivotally mounted in and longitudinally movable with said casing and having their optical axes in the same plane as said normal axis, an intermediate lens fixedly mounted in said casing with its optical axis coinciding with said normal axis, said lenses being so arranged that they have a common image plane and their optical axes intersect at a common point, means for reciprocally moving said casing and lenses carried thereby to correspondingly move the common image plane towards and away from said lens mount, cam mechanism operable by said reciprocal movement to move said spaced apart lenses relative to the intermediate lens in a manner to maintain intersection of the optical axes at a common point, and to maintain exact registry in said common image plane of the images respectively projected by the lenses, means for oscillating said lens mount about said normal axis, means for adjusting said lenses to maintain their optical axes in a common plane, and means for shifting the film transversely to bring its longitudinal center line into coincidence with the plane containing said optical axes.

10. In apparatus of the kind described, the combination with film or plate supporting means of a lens mount angularly adjustable about an axis normal to the film or plate, said lens mount comprising a supporting member, a casing open at the ends and longitudinally movable in the direction of said axis, two spaced apart lenses symmetrically positioned in said casing on opposite sides of said normal axis, said lenses being pivotally mounted in and longitudinally movable with said casing and having their optical axes in the same plane as said normal axis, an intermediate lens fixedly mounted in said casing with its optical axis coinciding with said normal axis, said lenses being so arranged that they have a common image plane and their optical axes intereect at a common point, means for reciprocally moving said casing and lenses carried thereby to correspondingly move the common image plane towards and away from said lens mount, cam mechanism operable by said reciprocal movement to correspondingly move said spaced apart lenses laterally relative to the intermediate lens in a manner to maintain intersection of their optical axes at a common point, and to maintain exact registry in said common image plane of the images respectively projected by said lenses, means for oscillating said lens mount about said normal axis, adjusting means operable to maintain the optical axes of the lenses in a common plane, means for shifting the film or plate transversely to bring its longitudinal center line into coincidence with the plane containing said optical axes, and means for moving said lens mount away from said film supporting means to facilitate the insertion and removal of the film.

RUDOLPH J. ANSCHICKS.
JOSEPH P. STANDO.
KENNETH W. KENNEDY.